US008628815B2

(12) United States Patent
Torney et al.

(10) Patent No.: US 8,628,815 B2
(45) Date of Patent: Jan. 14, 2014

(54) LOW SHEAR MEAT ANALOG

(75) Inventors: Allan A. Torney, Brampton (CA); Diana L. Ortiz Maldonado, White Plains, NY (US); Alexandre C. Mendes, Los Alamitos, CA (US); Emine Unlu, Franklin, TN (US); Ralf Reiser, Franklin, TN (US); Eyal Ben-Yoseph, Yoqneam (IL)

(73) Assignee: Mars, Inc., McLean, VA (US)

( * ) Notice: Subject to any disclaimer, the term of this patent is extended or adjusted under 35 U.S.C. 154(b) by 744 days.

(21) Appl. No.: 12/208,996

(22) Filed: Sep. 11, 2008

(65) Prior Publication Data

US 2009/0068336 A1 Mar. 12, 2009

Related U.S. Application Data

(60) Provisional application No. 60/971,849, filed on Sep. 12, 2007.

(51) Int. Cl.
A23L 1/31 (2006.01)
(52) U.S. Cl.
USPC .......................................................... 426/574
(58) Field of Classification Search
None
See application file for complete search history.

(56) References Cited

U.S. PATENT DOCUMENTS

| 3,693,533 | A |   | 9/1972  | Liepa |
| 3,736,148 | A | * | 5/1973  | Katz ............................. 426/656 |
| 3,840,679 | A |   | 10/1974 | Liepa et al. |
| 3,886,299 | A | * | 5/1975  | Feldbrugge et al. .......... 426/656 |
| 4,021,584 | A |   | 5/1977  | Rankowitz |
| 4,118,164 | A |   | 10/1978 | Wenger et al. |
| 4,125,635 | A | * | 11/1978 | de Ruyter ..................... 426/506 |
| 4,185,123 | A |   | 1/1980  | Wenger et al. |
| 4,338,340 | A |   | 7/1982  | Morimoto et al. |
| 4,346,652 | A |   | 8/1982  | de Ruyter |
| 4,544,560 | A |   | 10/1985 | O'Connell |
| 4,769,251 | A |   | 9/1988  | Wenger et al. |
| 4,781,939 | A | * | 11/1988 | Martin et al. ................. 426/646 |
| 5,792,504 | A |   | 8/1998  | Poppel et al. |

(Continued)

FOREIGN PATENT DOCUMENTS

| EP | 0265740        | 5/1988 |
| GB | 1500261 A      | 2/1978 |
| WO | WO-01/47370 A1 | 7/2001 |

OTHER PUBLICATIONS

International Search Report issued Nov. 18, 2008, (Published Mar. 19, 2009), during the prosecution of International Application No. PCT/US2008/075932.

(Continued)

Primary Examiner — Humera Sheikh
Assistant Examiner — Subbalakshmi Prakash
(74) Attorney, Agent, or Firm — Fulbright & Jaworski LLP

(57) ABSTRACT

Methods for producing meat analog as well as formulations are disclosed. The novel production method uses a device designed to texturize the product while providing superior heat transfer for cooking. The device includes a helical compression conveyer with internal and external heating sources that delivers a high ratio of surface area for heat transfer to product volume. This results in the device being capable of heating of the emulsion volume as it is moved from the inlet to the outlet of the device to form a meat analog within the device in which the meat analog is formed in multiple segments to result in the meat analog having a defined surface texture.

11 Claims, 5 Drawing Sheets

(56) References Cited

U.S. PATENT DOCUMENTS

| | | |
|---|---|---|
| 6,001,402 A | 12/1999 | Dupont |
| 6,238,726 B1 | 5/2001 | Fischer |
| 6,309,682 B1 | 10/2001 | Janot et al. |
| 6,319,539 B1 | 11/2001 | Shemer et al. |
| 6,379,738 B1 * | 4/2002 | Dingman et al. ............ 426/646 |
| 6,410,079 B2 | 6/2002 | Cheuk et al. |
| 6,635,301 B1 * | 10/2003 | Howsam ..................... 426/574 |
| 6,649,206 B2 | 11/2003 | Dingman et al. |
| 2001/0041202 A1 | 11/2001 | Dupont et al. |
| 2001/0053405 A1 | 12/2001 | Cheuk et al. |
| 2005/0031673 A1 | 2/2005 | Saylock et al. |
| 2007/0148323 A1 * | 6/2007 | Dingman et al. ............ 426/646 |

OTHER PUBLICATIONS

Written Opinion issued Nov. 18, 2008, during the prosecution of International Application No. PCT/US2008/075932.

International Preliminary Report on Patentability issued Mar. 16, 2010, during the prosecution of International Application No. PCT/US2008/075932. Published Mar. 16, 2010.

\* cited by examiner

LOW SHEAR MEAT ANALOG

CROSS-REFERENCE TO RELATED APPLICATIONS

The present invention claims priority to U.S. Provisional Patent Application Ser. No. 60/971,849, filed Sep. 12, 2007, which is incorporated by reference herein in its entirety.

TECHNICAL FIELD

The present invention relates to the production of a meat emulsion product having a meat-like appearance and surface texture and the products so produced, and more specifically to a meat analog product and process utilizing low shear extrusion technology.

BACKGROUND OF THE INVENTION

The production of meat analogs consist of 2 main stages: emulsion preparation and formation of a chunk. Emulsion is prepared by mixing, chopping and emulsifying a mixture of proteins, salts, fat and other inclusions to form a matrix of proteins that encapsulates the fat and the non-soluble inclusions. The emulsion is then heated under pressure that is aimed in a specific direction. The pressure arranges and orients protein chains and helps the formation of a three-dimensional network. The heat denatures the proteins and sets the matrix in this irreversible form.

Compressive force extrusion processes (also termed extrusion-expansion procedures) for producing meat analogs are known in the art. U.S. Pat. No. 6,649,206 describes a method for producing meat emulsion products with a high level of proteins and a low level of fat. A holding tube and texture enhancement device is used to texturize the products. U.S. Pat. No. 6,379,738 describes the same process, but for product with higher fat content. U.S. Pat. No. 4,125,635 describes a device for texturing protein products which has a typical extruder design. U.S. Pat. No. 6,319,539 describes a method to prepare fibrous food products which mainly comprised of plant proteins (gluten). The foregoing processes have proven unsuitable for making texturized meat products using animal meats rather than vegetable protein sources because of the high shear force exerted on the analog materials. U.S. Pat. No. 4,781,939 describes a method of producing a meat emulsion product in which a heated emulsion is introduced into an elongated tube by centrifugal force while maintaining the emulsion under a pressure greater than the vapor pressure of the emulsion. Upon depressurization, steam forms in the emulsion and disrupts the emulsion mass to form discrete pieces of set emulsion. This type of process is termed "pipe flow" because the meat analog materials flow through the tube as a generally linear stream. The pipe flow processes of the prior art produce relatively low shear force on meat analog materials during processing which makes possible the use of higher amounts of meat derived proteins than compressive force extrusion processes. However, the pipe flow processes and the apparatuses designed to perform these processes have significant problems and disadvantages for food processing. Heat transfer to the transiting meat analog materials is sub-optimal and the product chars or burns onto the interior surface of the elongated tube. The prior art pipe flow processes are also limited in that they are not adaptable for use in making meat analogs with a high fat content (i.e. the protein to fat ratio should be at least about 1.5:1). Finally, the processes available in the art are not capable of delivering a meat analog with a high animal protein content and the desired surface texture and appearance of whole meats. Thus, there is a need in the art to address the foregoing limitations to provide improved meat analog products and manufacturing processes.

BRIEF SUMMARY OF THE INVENTION

In one embodiment, the specification discloses a meat product which comprises:
a) a physical structure comprising individual segments with a length from 0.125 to 0.75 inches and a width of 0.125 to 0.25 inches,
b) 10-28% protein,
c) 0.5-20% fat,
d) 50-75% moisture, and
e) a water activity of 0.85-0.90,
wherein 80% or more of the protein is derived from animal sources.

In one embodiment, the specification discloses a textured meat product which comprises:
a) 19% or less protein, and
b) about 50% or greater moisture content,
wherein greater than 80% of the protein content is from animal sources.

In one embodiment, the textured meat product, further comprises a water activity of 0.85-0.95.

In one embodiment, the meat product has an external surface appearance and texture as shown in FIG. 5.

In one embodiment, the specification discloses a process for making a meat analog comprising the steps of:
a) forming an emulsion comprising one or more ingredients supplying protein and fat,
b) introducing the emulsion into a device through an inlet,
c) moving the emulsion through the device to an outlet under conditions comprising
   i) added heat,
   ii) added pressure, and
   iii) at least one step of moving at least one emulsion exposed heat exchange surface in relation to at least one other emulsion exposed heat exchange surface,
wherein the device has a ratio of a heat transfer surface area to an emulsion volume that results in the device being capable of heating of the emulsion volume as it is moved from the inlet to the outlet of the device to form a meat analog within the device, and wherein the meat analog forms in multiple individual segments to result in the meat analog having a textured surface.

In one embodiment, the process results in a meat analog which comprises
a) 10-28% protein,
b) 0.5-20% fat,
c) 50-75% moisture, and wherein 80% or more of the protein is derived from animal sources.

In one embodiment, the step of moving at least one emulsion exposed heat exchange surface in relation to at least one other emulsion exposed heat exchange surface is continuous during the process of making the meat analog.

In one embodiment, the added heat results in an emulsion temperature of from about 60° C. to about 100° C.

In one embodiment, the added pressure results in a pressure on the emulsion of from about 10 PSI to about 100 PSI.

In one embodiment, the emulsion is formed under a vacuum of about −10 inches Hg to about −30 inched Hg. This is only done in the preparation of the emulsion not when it is passing through the cooking step in the LSE.

In one embodiment, the emulsion is formed at about 15° C. to about 20° C. after emulsification.

In one embodiment, the formed emulsion is maintained at a temperature below 25° C. and in a closed container until the emulsion is extruded through the device.

In one embodiment, the emulsion is 14-20% protein.

In one embodiment, the protein is from animal sources.

In one embodiment, the process does not comprise a terminal compressive force extrusion step after the meat analog is formed within the device.

In one embodiment, the emulsion has a protein to fat ratio of about 3 to 2.

In one embodiment, the device is a helical compression conveyor having a compression ratio from the inlet to the outlet of about 1:1 to about 1:6.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Definitions and Methods

Figure 1:
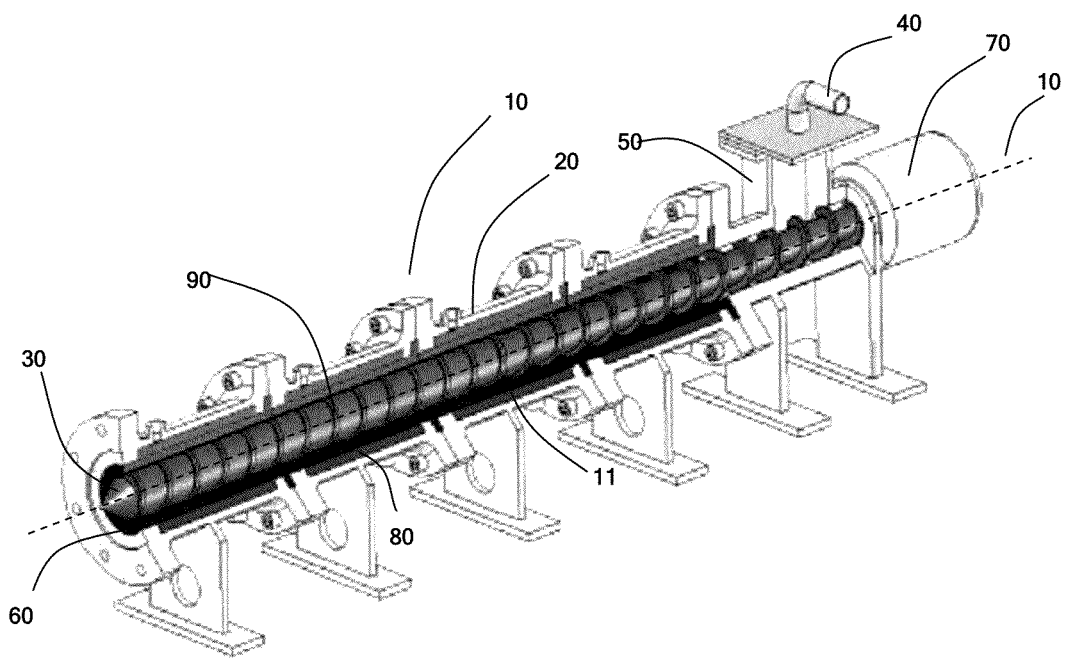
FIG. 1 is cut away side view of an example low shear helical compression conveyor device.
Figure 2:
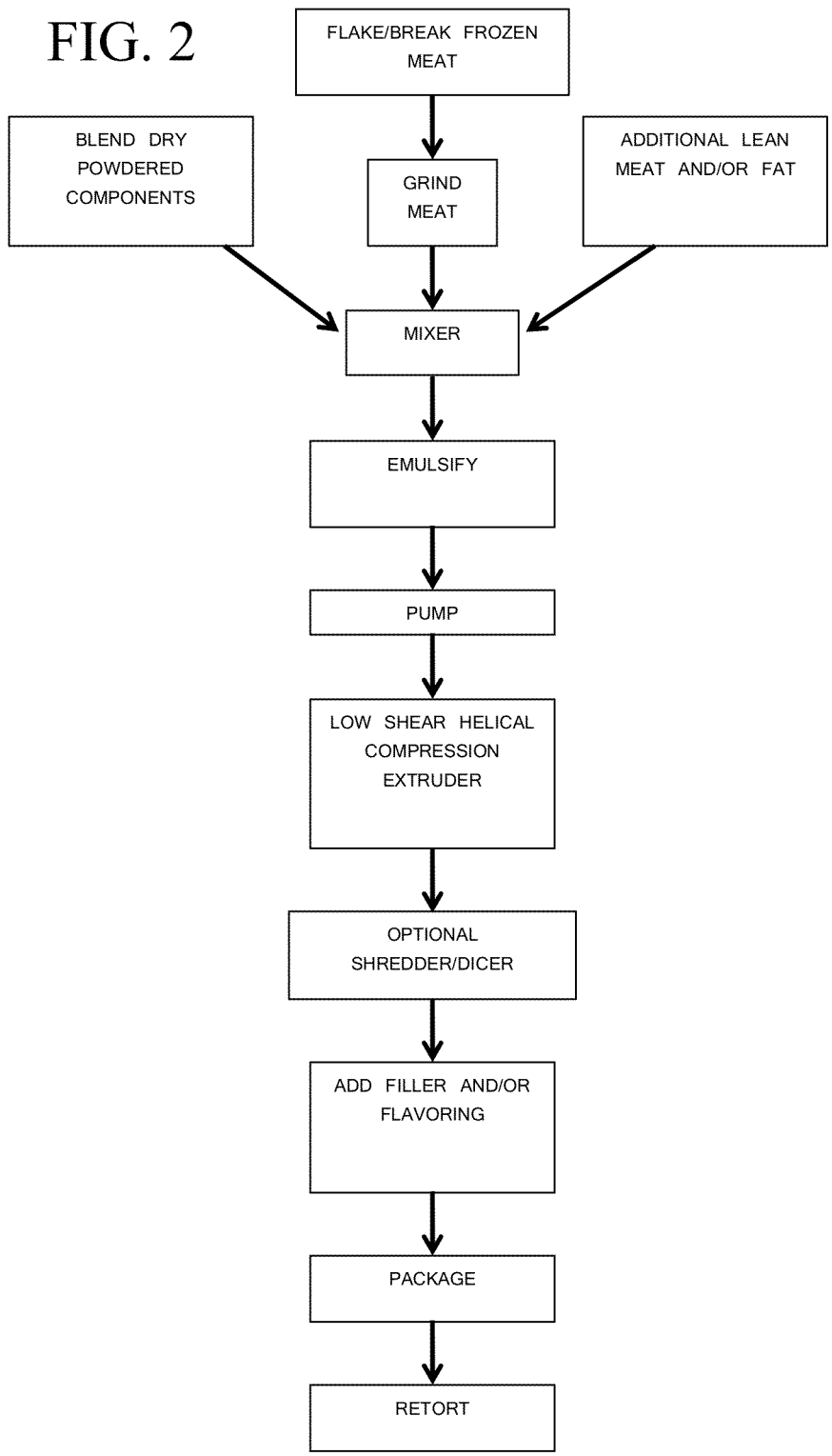
FIG. 2 is a flow chart showing the preferred process for manufacturing a meat analog.

Water activity ($a_w$) refers to water in food which is not bound to food molecules. The water activity scale extends from 0 to 1.0 but most foods have a water activity level in the range of 0.2 for very dry foods to 0.99 for moist fresh foods.

Binding index is the relative amount of salt-soluble, heat-coagulable proteins (SSHCP) in a meat. The highest SSHP content known is in Bull meat which is arbitrarily set at a binding index of 100.

Tenderness of the meat analog products described herein may be assessed for example by visible or infrared spectroscopy evaluation. See, e.g., S. D. Shackelford, T. L. Wheeler, M. Koohmaraie, *On-line classification of US Select beef carcasses for longissimus tenderness using visible and near-infrared reflectance spectroscopy, Meat Sci.* 69 (2005) 409-415.

Elasticity of the meat analog products described herein may be assessed for example by well known Instron testing techniques. See, e.g., U.S. Pat. No. 4,784,864 at Col. 5, line 63-Col. 6, line 16.

Density (Mass/Volume) of the meat analog is calculated by industry standardized methods whereby a known mass of chunk is placed in a known volume of water. The displacement of the water solution by the chunk is measured to determine the mass of the chunk.

Porosity or Bulk density of the meat analog may be measured by allowing the meat analog to freely fall into a container of known volume and measuring the weight of the meat analog in the container after wiping the excess material level with the opening of the container.

Water Holding Capacity is a standard, established characteristic measured in meats and meat analogs. See, Hamm (1975), "Water-Holding Capacity of Meat," in Meat, Cole and Lawrie eds., p. 321. The water-holding capacity of the meat analog products described herein may be assessed for example by the methods described in Honikel, K. O. (1998) *Reference methods for the assessment of physical characteristics of meat, Meat Sci.* 49: 447-457.

Fat-Proximate analysis of the meat analogs disclosed herein may be accomplished by the established and art recognized methods detailed in "Analyzing Food for Nutrition Labeling and Hazardous Contaminants" by I. J. Jeon and W. G. Ikins (Marcel Dekker, Inc., New York, 1995; ISBN-10: 0824793498) and "Methods of Analysis for Nutrition Labeling," edited by D. M. Sullivan and D. E. Carpenter (AOAC International, Arlington, Va., 1993; ISBN-13: 978-0935584523).

Moisture-Proximate analysis of the meat analogs disclosed herein may be accomplished by the established and art recognized methods detailed in "Analyzing Food for Nutrition Labeling and Hazardous Contaminants" by I. J. Jeon and W. G. Ikins (Marcel Dekker, Inc., New York, 1995; ISBN-10: 0824793498) and "Methods of Analysis for Nutrition Labeling," edited by D. M. Sullivan and D. E. Carpenter (AOAC International, Arlington, Va., 1993; ISBN-13: 978-0935584523).

Protein-Proximate analysis of the meat analogs disclosed herein may be accomplished by the established and art recognized methods detailed in "Analyzing Food for Nutrition Labeling and Hazardous Contaminants" by I. J. Jeon and W. G. Ikins (Marcel Dekker, Inc., New York, 1995; ISBN-10: 0824793498) and "Methods of Analysis for Nutrition Labeling," edited by D. M. Sullivan and D. E. Carpenter (AOAC International, Arlington, Va., 1993; ISBN-13: 978-0935584523).

Color of the meat analog products described herein may be assessed for example by the methods described in "Guidelines for Meat Color Evaluation" published by the American Meat Science Association, originally in the 1991 Proceedings of the Reciprocal Meat Conference (Volume 44).

pH may be determined using commercially available pH meters.

Texture of the meat analog products described herein may be assessed for example by the methods originally described in Bourne, M. C. (1978) *Texture profile analysis, Food Technology* 32:62-66, 72; See also Peleg, M. (1996) *Texture profile analysis parameters obtained by an instron universal testing machine, J. Food Sci.* 41:721-723.

Various Aspects and Embodiments of the Invention

The invention relates to a meat analog and the process for its manufacture. The process begins with ingredient selection. The ingredients include a source of protein, a source of fat and salt. The protein source may include animal proteins from beef, pork, chicken and/or fish. The ingredients optionally further include one or more of dextrose, sorbitol, starch, soy proteins, gelatin, gluten, blood plasma, nitrates, phosphates, vitamins and minerals. Additional flavorings such as meat flavoring and fillers such as those made from cereals may be added. For fish analog it is preferred to add surimi.

Contractile meat proteins serve as an emulsifying agent in a meat emulsion. To form a stable meat emulsion, these proteins surround the finely chopped fat particles before cooking. Myosin, the major contractile protein of meat, is the most important of the proteins for fat emulsification and the water holding capacity of processed meats. The Sarcoplasmic proteins have low functionality in generating a protein matrix, but can still serve as emulsifiers. Stromal proteins do not have emulsification properties. To generate a stable emulsion and a strong product it is preferred to use meat with a high amount of contractile proteins and a low amount of Sarcoplasmic and Stromal proteins. The following is a rank of different meat sources by their binding index (from high to low): lean beef (20-25), tongues (7-8), heart (6-7), liver (2), and skin (0). A function of salt in preparing meat emulsions is its ability to extract and dissolve these salt-soluble proteins.

Surimi is a Japanese name for mechanically deboned fish flash that has been washed with water and mixed with cryoprotectants for a good frozen shelf life. Surimi is highly concentrated with myofibrillar protein, primarily actomyosin (85% by weight dry). Soy Protein Isolate is highly soluble and functional and, with proper formulation, up to 50% of a meat product's protein may derive from soy protein solution without affecting flavor or texture. Gluten is a protein contained in wheat and other cereals that are made into flour. In a meat emulsion, gluten helps to strength the matrix formed by meat proteins. Various cereal flours are used as binders or extenders in meat products and can improve binding qualities and cooking characteristics. Nitrites serve as an antioxidant and a preservative and preserve the red color of meat. Phosphates are added to increase the water holding capacity of an emulsion resulting in improved tenderness and juiciness in a final meat product.

The ingredients are ground or otherwise reduced in unit size as necessary to facilitate ingredient mixing. Preferably, the protein source components are ground or minced to a size of 0.5 cm or smaller, although larger pieces may also be used. If frozen meat is used, the meat is preferably flaked or broken up prior to grinding. The preferred mixing process step is to blend dry and powdered ingredients together, and then feed these into a mixer along with ground meat, water and any other ingredients. Once mixed, these mixed ingredients are then transferred into an emulsifying device.

Next, the ingredients are emulsified in a large variety of known food processing devices designed to make meat emulsions. During emulsion, the water and the salt-soluble meat proteins form a matrix that encapsulates the fat. The emulsion consists of fat globules covered with contractile proteins, water-salt solution, soluble contractile proteins, and collagen connective tissue fiber. Smaller fat globules require more contractile protein to hold the matrix. If the fat globules are coated by the collagen instead of the contractile proteins, when heated, the emulsion may break. This also may happen when heating too fast due to rupture of the protein surrounding the fat globules in the emulsion.

A preferred process to form a meat emulsion is to a) blend ground meat, salt, water, spices and nitrate at less than 10° C., preferably 0-5° C.; b) add a source of fat and blend until the mixture reaches 0-15° C.; and c) transfer the mixture to a mincing emulsifier and comminute. The preferred emulsification process takes place under vacuum to eliminate the incorporation of air into the mixture (preferably −10 to −30 inches of Hg, more preferably −25 to −30 inches of Hg). Mixing duration at each stage is preferably about 3 minutes. A good emulsion generally has the characteristics of extensibility, cohesiveness, elasticity, and a surface appearance, which is opaque, and may be stretched by hand. It is preferable to process the emulsion within an hour or less of its manufacture. Before processing, the emulsion is preferably kept below room temperature and also preferably covered to reduce moisture absorption or release, air oxidation, and the coalescence of fat globules.

The emulsion has these preferred characteristics:

|  | Preferred | More preferred Range | Most Preferable Range |
| --- | --- | --- | --- |
| Protein Level | 10-30% | 14-20% | 16-18% |
| Fat Level | 0.5-20% | 6-16% | 12-16% |
| Moisture Content | 50-75% | 60-75% | 60-70% |
| pH | 5-7 | 5.0-6.3 | 5.8-6.0 |
| Water activity | 0.85-0.95 | 0.90-0.94 | 0.91-0.93 |

Preferably, the emulsion also contains at least 1% salt, more preferably about 1.5% salt. The emulsion preferably has a protein to fat ratio of about 3 to 2. The emulsion is then processed through a helical compression conveyor under pressure. In a preferred embodiment, a pump removes the emulsion from the emulsifying device and feeds the emulsion into the helical compression conveyor under pressure.

General Description of Process Conditions

In a normal open screw conveyor, the product is pushed and or pulled along the length of the conveyor in the direction of flow. In a meat based system the motive force is provided by friction of the meat against the wall of the conveyor, and against the face of the conveying screw. If the screw or wall is heated, as in a thermal screw, the release of fat and moisture serves as a lubricant, reducing the friction and restricting or even eliminating the conveying capacity. When conveying is eliminated, the conveyor essentially becomes a ribbon blender, mixing the product and eliminating the potential of forming a solid heat set product. In a standard high shear cooking extruder (as manufactured by Wenger Mfg. Sabeth, Kans.) and to a lesser extent in a low shear cooking extruder (as manufactured by Bonnot) the material is generally conveyed through friction created at the screw flight face, and against the extruder barrel wall. Friction is amplified by the addition of channels running parallel to the extruder barrel wall. The product conveyed in the screw flights moves in a helical motion within the screw flight. The constant shear against the barrel wall helps to minimize fouling and to create frictional heating. As in a thermal screw, when moving a high moisture meat emulsion through a single screw extruder, the melting of fat, and release of liquid/water through cooking, acts as a lubricant reducing the frictional coefficient and drastically reducing product flow. When the viscosity of the cooked meat emulsion exceeds the frictional carrying capacity of the screw, the flow essentially drops to zero, and the product stops moving through the screw channel and burns in place.

Figure 5:
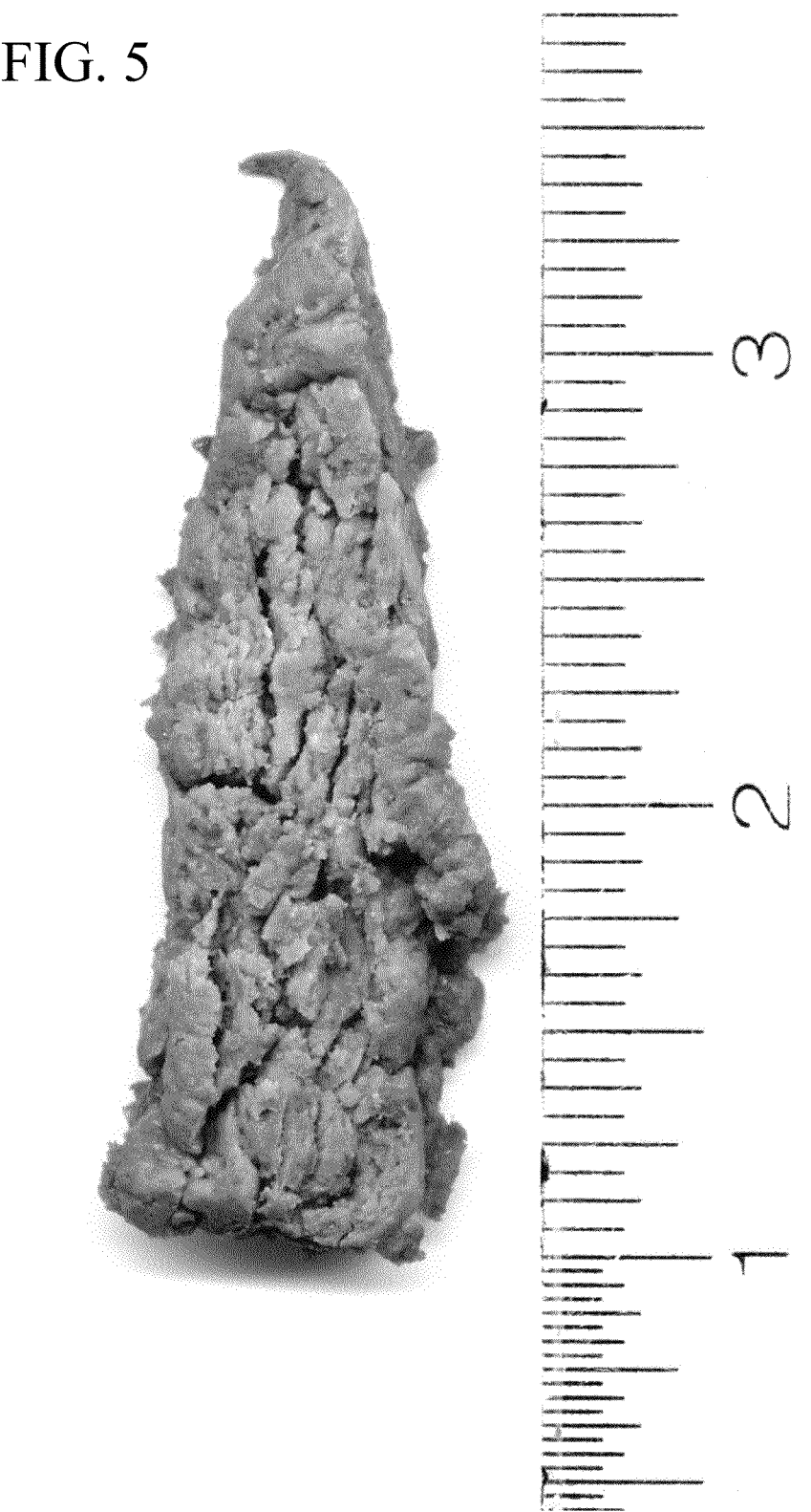
FIG. 5 is an image of the meat analog produced by the methods of this invention showing that the structure of the product is composed of individual segments within a piece have a length dimension from 0.125 to 0.75 inches and a width of 0.125 to 0.25 inches.

In one embodiment of this disclosure, a screw is used to convey the product, but is assisted in this function by a positive displacement pump. Because the pump is providing much of the motive force, the screw may be rotated at a much reduced speed while still supporting meat emulsion transit through the helical conveyor device. This slow speed rotation allows for reduced shear forces on the meat emulsion during the process and permits formation of the desired meat analog (e.g. as shown in FIG. 5) using the desired concentrations of animal protein. Simultaneously, the slow rotation is still sufficient to continuously change the heat transfer surface exposed to the meat emulsion. This has the advantages of 1) improved cooking capacity and 2) the prevention of emulsion charring or burning onto the internal surfaces of the device. In the initial sections of the barrel, the flow in the centre of the channel is faster than on the inner and outer boundaries as a result of friction against the barrel wall and screw face. As the product is heated and the protein begins to denature, protein coagulation occurs against the barrel wall and screw root. The meat emulsion begins to slip as a result of the lubrication provided by the released fats and moisture. If the pump was not providing sufficient flow or pressure, the product flow would stop. In this transition phase, wherein the surface regions have coagulated (heat Set) the inner emulsion face continues to flow at a faster rate than the outer surfaces creating laminar stretching and meat segment formation. As the channel depth decreases through the expansion of the screw root (e.g. 30), the rate of flow and stretching increases. When the proteins have coagulated throughout the channel, the product transitions to a plug flow mode, sliding through the final section of screw flights to the outlet. This transition to plug flow should generally be timed to occur when the screw geometry and/or cross section has stopped changing. If the screw continues to compress, the product will be subject to compression shear and will begin to break down.

In a situation where the screw is not rotating, there will be a steady build up of protein on the barrel wall and screw shaft. This will reduce the heat transfer rate, slowing the rate of denaturation and heat setting and resulting in delaying of the final heat set until later in the steady state conveying zone. Eventually with increase build up or burn on, the coagulation will slow down to the point at which the product is not completely cooked, or to a point at which the friction between the barrel wall and screw root and meat flow becomes sufficiently high to eliminate the slip flow and stop the chunk forming process. This is similar to what is experienced in prior art tubular heat exchange systems. By rotating the screw, the present embodiment avoids these deleterious consequences.

In one embodiment of this disclosure, the screw is rotated to constantly clean the heat exchange surfaces, allowing essentially a continuous process for meat analog forming without loss of heat exchange capability and without generating excessive shear forces. An additional benefit of rotating the screw is that it increases the apparent rate of movement across the barrel wall. The rotational speed and heat exchange efficiency are normally optimized to achieve a desired product quality and throughput. As the rotational speed increases, it increases the efficiency and rate of heat transfer, speeding up the cooking process. This provides a benefit of allowing a significantly higher cooking rate than would be expected or anticipated in a tubular or static heat exchange situation. This must be balanced against excessive rotational speed which creates undesirable shear forces which may lead to break down of the emulsion and consequently loss of meat analog texturization as is seen with prior art tubular heat exchange systems (pipe set processes). Conversely, too slow of a rotational speed may result in burn on and loss of heat transfer. Additionally, because the screw rotation contributes some motive force to the meat emulsion, too slow of a rotation would result in loss of emulsion movement in the latter portion of the device, because the positive displacement pump is generally insufficient alone in this regard. The optimum rotational speed range is determined by product flow, viscosity and cook release characteristics. Heat exchange should generally be matched between the barrel wall and screw flight to minimize shear influences and uneven cooking rates. If the heat transfer between the outer wall and the screw root becomes unbalanced, the friction differential will create shear and destroy the product integrity.

Figure 3:
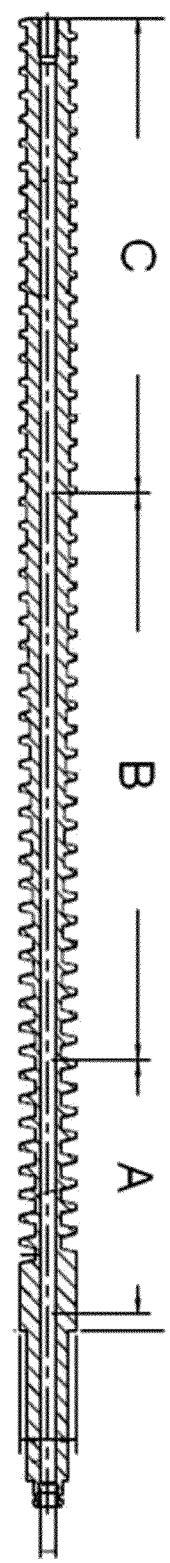
FIG. 3 is a simplified cut away side schematic of an example low shear helical compression conveyor device showing the dimensional changes to the central shaft and to the spacing of the attached vanes from device inlet to outlet.

In one embodiment of this disclosure, both the screw shaft (root) and barrel are heated to provide uniform heat transfer. Heat transfer from both elements also improves heat transfer rates to the meat emulsion resident in the device. Heat transfer is further enhanced by screw rotation to continuously renew heat transfer surface area exposed to the meat emulsion. Excessive heat on the barrel wall or screw root will cause the product to cook into solid mass before it has passed through the compression zone (FIG. 3, B) into the steady state conveying zone (FIG. 3, C). This will result in unacceptable shear and product destruction. Excessive heat will not allow the product to form into a uniform ribbon or strip of meat. Excessive heat will also create internal shear within the emulsion through creation of steam.

The optimum temperatures and product flow rates will be dependent on formulation and composition. The system should generally be adjusted to ensure that cooking is completed after the compression zone (in section C of the device as shown in FIG. 3 and discussed further below) but prior to the device exit. Cooking can be controlled through flow rate, temperature gradient and through rotational speed to achieve optimal heat exchange efficiency.

The general structure of a preferred helical compression device is shown in sectional view in FIG. 1. The screw element shaft (30) can be seen to be gradually wider in diameter from the input (50) of the device to the output aperture (60). The helical flights (90) in turn are reduced in size to match the distance between the barrel wall (20) and the screw shaft (30). Consecutive turns of the helical flights (90) also grow gradually further apart as the helical flight (90) extends around the shaft from the input (50) to the output (60). In use, this structure places limited shear force on the transiting meat analog as the screw turns.

The structure in use has three operational sections A, B and C where different aspects of meat analog formation occur, illustrated in FIG. 3. Initial feed section A of the device has large flights to facilitate emulsion movement into the device from the input. In the initial feed section A of the device, the meat emulsion is moved through the device by an external motive force such as a positive displacement pump of first screw in a twin screw arrangement. Flow in the centre of the channel formed by the barrel (20), screw shaft (30) and flights (90) is faster than on the inner and outer boundaries as a result of friction against the barrel wall and screw face.

The compression section B has a widening root diameter with a decreasing flight depth. In compression section B of the device, as the product is heated and the protein begins to denature, protein coagulation occurs against the barrel wall and screw root. The meat emulsion begins to slip as a result of the lubrication provided by the released fats and moisture. In this transition phase occurring in compression section B, the surface regions have coagulated and the center emulsion area continues to flow at a faster rate than the outer coagulating areas creating laminar stretching and meat segment formation. As the channel depth decreases through the expansion of the screw root (e.g. 30), the rate of flow and stretching increases.

In metering section C of the device, the proteins have coagulated throughout the channel and the product transitions to a plug flow mode, sliding through the final section of screw flights to the outlet. Fat and moisture are expressed in generous amounts from the metering section which facilitates plug flow by the meat analog. This transition to plug flow should generally be timed to occur when the screw geometry and/or cross section has stopped changing. The metering section C has a constant root diameter with relatively short flights. If the screw continues to compress, the product will be subject to compression shear and will loose the desired texturization and structure. The emulsion forms a relatively thin film of material in section C which reduces the volume of emulsion for more effective penetration of heat emanating from the heating surfaces (screw and barrel wall). Metering section C is where meat emulsion cooking is completed and surface texturization forms. Texturization begins in the latter part of this section C and the location at which this occurs should be optimized for the particular emulsion formula and desired texturization because excessive heat exposure in this section may break the protein structure. Factors for optimization may include barrel fill volume, exposure length, temperature, emulsion content and screw rotation speed.

Exemplary Device

The exemplary extruding device (10) is a specially modified Bonnot Extruder Single Screw 2¼, shown in FIG. 1. The device (10) has a hollow cylinder or barrel shaped outer housing (20) with a central axis (100) extending through the center of the cylinder (20). Mounted within the barrel (20) is a rotatable shaft (30) having a helical vane (90) attached to the outer surface of the shaft (30). The shaft (30) and barrel (20) define a space (110) between the outer shaft surface and the inner barrel wall. The helical vane (90) extends from the shaft (30) outer surface to the barrel (20) inner wall. The shaft (30) progressively increases in diameter from inlet (50) to outlet (60) with an overall conical shape. This results in flattening and compression of materials as they are pumped through the device (10). Preferably the screw compression ratio from inlet (50) to outlet (60) is about 1:1 to about 1:6, more preferably about 1:1.25 to about 1:5 and most preferably about 1:2 to about 1:4. The preferred device (10) is modified from its original structure in that outlet (60) does not function as an end point compressive force extruder as is commonly found on devices for manufacturing meat analogs based on vegetable protein sources. While a shaping die may be used to form the exiting meat analog into a desired shape, such a die should result in little back pressure within the device or compressive shear forces on the exiting meat analog such that the desired surface appearance and texture is not lost. This low shear egress allows a substantially meat protein based meat analog to emerge with the desired texture and structures similar to real muscle tissue. This is in contrast to vegetable protein based products which generally are processed at high shear and pressure through an extruding element to achieve a texture and features mimicking natural muscle tissue. This type of extrusion methodology has not been found to be useable for meat derived protein materials, in particular those meat products with higher fat contents. If a traditional extrusion device was to be used the partially set emulsion mass would experience excessive shear and the protein structure would break down. The breakdown occurs as a result of the shear that is imparted in a traditional extrusion process, and over the length of the traditional texturization die. The material has a tendency to accumulate prior to the die, experiencing high compressive and shear forces as it enters the die. Thus, the low shear approach enabled by the present disclosure makes possible animal protein based, meat analogs having the desired texture and structure (e.g. FIGS. 4 and 5).

The device (10) has a plurality of heating elements in the form of fluid jackets for holding heated fluids such as water in conductive contact with parts of the device. These fluid jackets include multiple barrel fluid jackets (80) disposed within the barrel wall along the length of the barrel (20). Other heating elements include fluid jackets disposed within the vane (90) and screw shaft (30) (not shown). The fluid jackets are connected by plumbing so that the fluid may be circulated and heated by an external pump and heating device (not shown). A motor (70) is connected to shaft (30) and drives the rotation of shaft (30). Tube (40) feeds a preformed emulsion into inlet (50) from a mincing emulsifier or other emulsion device (not shown). The emulsion generally is fed into device (10) through inlet (50) under pressure to force the emulsion material through device (10). Preferably this feeding pressure is from about 10 PSI to about 100 PSI.

Heat is transferred by conduction from the helical compression conveyer screw shaft (30), vane (90), and barrel (20) surfaces. The unique design of the preferred device (10) allows for a high surface area of heat transfer. With the preferred device (10), the heat transfer surface area is 587 inch$^2$ and the volume of material fully occupying the helical compression conveyer is 56 inch$^3$. This gives an area to volume ratio of 10.5 inch$^{-1}$ in the preferred device (10).

The device (10) cooks the emulsion while orienting the meat proteins in the direction of the material flow. The preferred device (10) functions as a helical compression conveyor. The progressively larger diameter of screw shaft (30) compresses materials against barrel (20) and helical vane (90) as the material transits the space (110) between the outer shaft surface and the inner barrel wall.

In some embodiments, an alternative to device (10) is a twin or multi-screw (i.e. shaft plus vanes) device where two or more linked sets of shafts, barrel(s) and helical vanes are operated in co-ordination.

Due to drag on the emulsion flow along the surfaces of device (10), the emulsion material flows in layers at different velocities and different residence times as it passes through device (10). Protein macromolecular networks are formed by rupture of intermolecular bonds that stabilize proteins in the native state. Due to cooking, the rearrangement and reorientation of polymer chains forms a three-dimensional network. This network is stabilized by heat transferred from device (10) that irreversibly denatures the proteins to generate new interactions and bonds. The process results in different layers of the emulsion being cooked at different rates. This results in the product having the desired texture as the material is simultaneously cooked by conductive heat transfer from multiple elements of the device.

The rotation of shaft (30) results in a small amount of motive force driving the emulsion through the helical compression device (10). This rotation also helps prevent fouling of the equipment from overcooking emulsion that is resident directly next to cooking surfaces such as the surfaces of screw shaft (30), vane (90), and barrel (20). However, this is preferably limited by the low shear nature of the cooking process because excessively high rotation speeds would increase shear forces and not yield a meat analog with the desired texture and structure. Hence, in many embodiments, a motive force generating element is used to drive the emulsion through device (10). The preferred motive force element is one that feeds the emulsion into device (10) under pressure so as to force the emulsion through device (10). The preferred embodiments include a pump, initial feeding screw or other means for driving emulsions through the device (10) under pressure.

The table below describes the preferred process conditions for the fiber orientation and cooking stage of the conveyance device:

|  | Preferred Range | More Preferable Range |
|---|---|---|
| Processing Pressure | 10-100 PSI | 30-40 PSI |
| Processing Temperature | 60-150° C. | 104-127° C. |
| Forming Time | 1-5 Min | 1-2 Min |

Figure 4A:
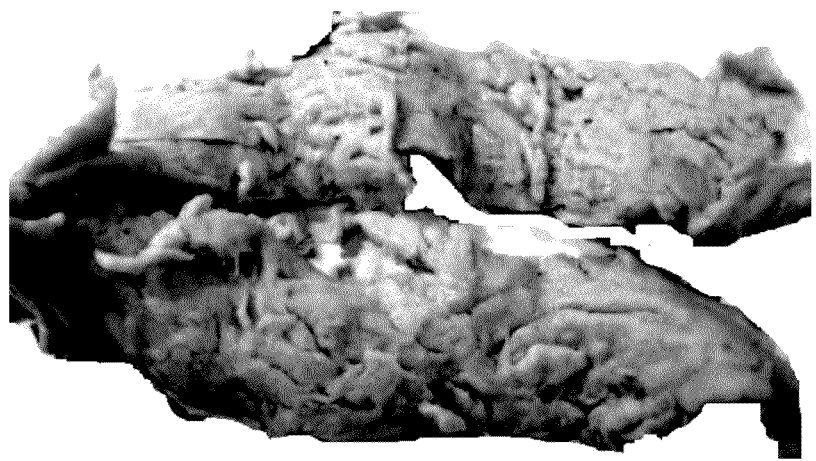
FIGS. 4A & 4B are images of the meat analog produced by the methods of this invention showing the layered texture of the product.
Figure 4B:

The resultant textured meat analog product has a plurality of distinct individual segments and closely resembles the external surface appearance of Mongolian beef. FIGS. 4A & 4B. The color and texture are also highly similar. The meat analog produced by the above steps is preferably produced as a continuous length sheet or ribbon of meat analog which may be further processed by dicing or cutting to a desired size.

The meat analog or meat product preferably contains less than 29% protein by weight, more preferably 19% or less protein. The table below describes the preferred characteristics of the final meat product in more detail:

|  | Preferred | More Preferred Range | Most Preferable Range |
|---|---|---|---|
| Product Protein Level | 10-28% | 15-22% | 16-18% |
| Product Fat Level | 0.5-20% | 10-20% | 12-17% |
| Product Moisture Content | 50-75% | 55-65% | 60-65% |
| Water activity | 0.85-0.90 | 0.90-0.93 | 0.90-0.92 |

EXAMPLE 1

A beef chunk product is produced using the following ingredients:

| Ingredient | Percent by weight |
|---|---|
| Lean beef | 10% |
| MDM beef | 35% |
| Salt | 1.5% |
| Sodium Tripolyphosphate | 0.5% |
| Fish | 8% |
| Chicken parts | 35% |
| Poultry liver | 6% |
| Plasma | 2% |
| Sugars, Colors, Minerals and Vitamins | 2% |

10 kg of ground lean beef is mixed with 35 kg of mechanically deboned (MDM) beef for 5 minutes. 1.5 kg of salt and 0.5 kg of Sodium Tripolyphosphate are added, and mixing continues for another 5 minutes. 35 kg of chicken parts, 8 kg of fish, 6 kg of poultry liver and 2 kg plasma are added and the mixing continues for another 5 minute. A 2 kg mixture of sugars, colors, minerals and vitamins are added and the mixing continues until a uniform mixture is achieved. The mixture temperature should not exceed 10° C. The mixture is emulsified and then processed at 110° C. and 40 PSI to form a meat chunk.

EXAMPLE 2

A chicken chunk product is produced using the following ingredients:

| Ingredient | Percent by weight |
|---|---|
| Chicken Breast | 10% |
| MDM chicken | 35% |
| Salt | 1.5% |
| Sodium Tripolyphosphate | 0.5% |
| Fish | 8% |
| Chicken parts | 35% |
| Poultry liver | 6% |
| Plasma | 2% |
| Sugars, Colors, Minerals and Vitamins | 2% |

10 kg of ground chicken breast is mixed with 35 kg of MDM chicken for 5 minutes. 1.5 kg of salt and 0.5 kg of Sodium Tripolyphosphate are added, and mixing continues for another 5 minutes. 5 kg of chicken parts, 8 kg of fish, 6 kg of poultry liver and 2 kg plasma are added and the mixing continues for another 5 minute. A 2 kg mixture of sugars, minerals and vitamins are added and the mixing continues until a uniform mixture is achieved. The mixture temperature should not exceed 10° C. The mixture is emulsified and then processed at 100° C. and 40 PSI to form a chicken chunk.

EXAMPLE 3

A fish chunk product is produced using the following ingredients:

| Ingredient | Percent by weight |
|---|---|
| Fish fillet | 40% |
| MDM chicken | 20% |
| Salt | 1.5% |
| Sodium Tripolyphosphate | 0.5% |
| Sunflower oil | 5% |
| Isolated soybean protein | 5% |
| Soybean flour | 15% |
| Water | 13% |

40 kg of ground fish filet is mixed with 20 kg of MDM chicken for 5 minutes. 1.5 kg of salt and 0.5 kg of Sodium Tripolyphosphate are added, and mixing continues for another 5 minutes. 5 kg of sunflower oil, 5 kg of Isolated Soybean protein, 15 kg of soybean flower, and 13 kg of water are added and the mixing continues until a uniform mixture is achieved. The process mixture temperature should not exceed 10° C. The mixture is emulsified and then processed at 90° C. and 30 PSI to form a fish chunk.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. All patents, published patent applications, non-patent literature and other references cited to herein, including those relied upon as priority documents, are hereby incorporated by reference in their entireties.

What is claimed is:

1. A process for making a meat analog comprising the steps of:
   a) forming an emulsion comprising one or more ingredients supplying 10-28% protein and 0.5-20% fat
   b) introducing the emulsion into a helical conveyor device having an inlet and an outlet with a screw compression ratio from the inlet to the outlet of 1:1 to 1:6, the device having at least a heated screw and a heated barrel, each having heated surface areas providing for a uniform heat transfer surface area;
   c) conveying the emulsion through the conveyor device by means of an external pump which provides a feeding pressure of 10 PSI to 100 PSI;
   d) transferring heat from the surface areas of the heated screw and barrel to the emulsion as it is conveyed through the helical conveyor device wherein a predetermined screw compression ratio results in an emulsion flow of layers of material at different velocities and different residence times as it passes through the device;
   e) wherein coagulation of the emulsion occurs against the heat transfer surface area of the heated screw and barrel resulting in the layers being cooked at different rates thereby forming a textured meat analog.

2. The process of claim 1, wherein the textured meat analog comprises a) 10-28% protein, b) 0.5-20% fat, c) 50-75% moisture, and wherein 80% or more of the protein is derived from animal sources.

3. The process of claims 1, wherein the heat from the surface area of the heated screw and barrel transferred to the emulsion results in an emulsion temperature of from about 60° C. to about 100° C.

4. The process of claim 1, wherein the emulsion is formed under a vacuum of about −10 inches Hg to about −30 inched Hg.

5. The process of claim 1, wherein the protein is from animal sources.

6. The process of claim 1, wherein the emulsion has a protein to fat ratio of about 3 to 2.

7. The process of claim 1, wherein the textured meat analog is formed in multiple individual segments.

8. The process of claim 1, wherein the formation of the meat analog further comprises a processing step in an initial feed section, a processing step in a compression section and a processing step in a metering section.

9. The process of claim 8, wherein the processing in the metering section provides a low shear egress that allows the meat emulsion to emerge with a texture and structure similar to real muscle tissue.

10. The process of claim 1, wherein as the heat is transferred from the screw and the barrel to the emulsion, the heat from the barrel and rotation of the heated screw continuously renews the heat transfer area exposed to the emulsion.

11. The process of claim 1, wherein the outlet provides little back pressure within the conveyor device or compressive shear forces on the meat analog as it exits the conveyor device.

* * * * *